United States Patent
Nakasaki

[11] 3,965,957
[45] June 29, 1976

[54] VEHICLE WHEEL STRUCTURE

[75] Inventor: Eiji Nakasaki, Kakogawa, Japan

[73] Assignee: Sumitomo Rubber Industries, Ltd., Japan

[22] Filed: Sept. 25, 1974

[21] Appl. No.: 509,040

[30] Foreign Application Priority Data
Sept. 25, 1973  Japan.......................... 48-111578[U]
Dec. 12, 1973  Japan.......................... 48-144556[U]

[52] U.S. Cl.............................. 152/400; 152/379 R
[51] Int. Cl.²...................................... B60C 5/04
[58] Field of Search.......... 152/400, 399, 379, 380, 152/381, 362 R, 362 CS, 365, 203, 314, 362, 427

[56] References Cited
UNITED STATES PATENTS

| | | | |
|---|---|---|---|
| 1,207,894 | 12/1916 | Geyer................................ | 152/314 |
| 1,667,594 | 4/1928 | Gibbons............................. | 152/427 |
| 1,886,470 | 11/1932 | Daddio............................. | 152/400 X |
| 2,822,017 | 2/1958 | Herzegh............................ | 152/362 R |
| 3,504,725 | 4/1970 | Fletcher et al.................. | 152/362 R |

*Primary Examiner*—Drayton E. Hoffman
*Assistant Examiner*—Norman L. Stack, Jr.
*Attorney, Agent, or Firm*—Stewart and Kolasch, Ltd.

[57] ABSTRACT

A vehicle wheel structure for use with a pneumatic tire to be fitted around the wheel rim of the wheel structure. The wheel rim is provided with a flexible, endless band of rubber material held flat on the surface of the wheel rim which faces the pneumatic tire. To avoid a lateral displacement of the flexible endless band relative to the wheel rim, the band is formed with a plurality of ribs which, when the band is held flat on the surface of the wheel rim, engage into mating grooves formed in the wheel rim structure. Separate bead stoppers are also employed to press the bead portions of the tire against the respective rim flanges to achieve tight contact between the bead portions of the tire and the respective rim flanges and also to seal holes through which bolts extend for securing the bead stoppers in position.

21 Claims, 6 Drawing Figures

VEHICLE WHEEL STRUCTURE

The present invention relates to a vehicle wheel structure for use in a vehicle and, particularly, a motorcycle, for the support of a pneumatic tire.

It is well known that a vehicle wheel structure has a circular rim around which a pneumatic tire is fitted. It is also known that there are two types of wheels; one wherein the rim is integrally formed with the hub through which a wheel supporting axle rotatably extends and the other wherein the rim is connected with the hub by means of a plurality of spokes which extend radially, outwardly from the hub. In any of these types of wheel structures, the wheel rim includes a drop center portion and a pair of opposed annular flanges which extend radially outwardly from respective side edges of said drop center portion.

A pneumatic tire, either with or without a tube disposed therein, has a pair of opposed bead portions which, when fitted in position around the wheel rim, tightly engage both respective portions adjacent the side edges of said drop center portion and respective inner surfaces of the flanges. At this time, the flanges serve to back up said bead portions of the pneumatic tire which tend to expand away from each other by the effect of the elasticity of the tire proper, thereby achieving a tight contact between each of said bead portions and a relevant portion on both sides of the drop center portion of the wheel rim.

In a conventional wheel structure of the second mentioned type designed particularly for use with a tubeless tire, it is also known that a flexible band, made of rubber material, is placed flat on the drop center portion of the wheel rim. The purpose for employing the flexible band is not only to ensure a substantially improved tight contact between the bead portions of the tubeless tire and the respective rim flanges on both sides of the drop center portion of the wheel rim, but also to substantially hermetically close all of the holes, formed in the wheel rim, to which corresponding ends of the individual spokes are connected through nipples or couplers. This tight contact plays an important role, particularly in a tubeless tire partially because air under pressure is contained in the annular space defined by the tire proper and the wheel rim and partially because once this tight contact is last, the tubeless tire will not function.

In the conventional wheel structure referred to above, mounting or installation of the pneumatic tire on the wheel rim requires careful handling procedures. By way of example, in view of the fact that the flexible band is merely placed flat on the wheel rim, placement of the pneumatic tire on the wheel rim in a known manner causes the flexible band to displace at local points in a direction substantially parallel to the wheel axle as the bead portions of the tire are alternately slipped over the rim flanges to permit the tire proper to assume a definite position around the wheel rim. Once the flexible band is displaced, the tight contact referred to above can no longer be obtained. Even if tight contact is achieved between the bead portions and the rim flanges, the displaced flexible band often allows air inside the tire to leak to the outside through the displaced points via some or all of the holes through which the spokes are connected to the wheel rim.

In another conventional wheel structure which is also designed for use with a tubeless tire, the tight contact between the bead portions of the pneumatic tire and the rim flanges is achieved by the use of a plurality of stoppers which are mounted around the wheel rim and between the opposed bead portions of the pneumatic tire in equally spaced relation to each other. Each of the bead stoppers has both side faces substantially shaped to cope with the corresponding inner surfaces of the rim flanges, representing a substantially semi-circular shape in cross section, and includes a bolt and a nut, said nut being adapted to be fastened to said bolt, externally, after said bolt has been inserted through the wheel rim with the body of said bead stopper resting on the drop center portion of the rim.

In the tired wheel structure, that is, a wheel assembly wherein the pneumatic tire is fitted around the wheel rim, each of the bead stoppers is held in position with the curved surface thereof in contact with the drop center portion of the wheel rim and with the side faces thereof pressing the respective bead portions of the pneumatic tire against the rim flanges.

In the conventional tired wheel structure wherein in the bead stoppers are employed, it has been found that because of the particular construction of each of said bead stoppers, a relative rotation about the wheel axle often occurs between the tire and the wheel rim, that is, the wheel structure, particularly when the tired wheel in question is operated after the pneumatic tire has been punctured or after their has been a considerable reduction in the pneumatic pressure inside the tire. In addition, contact between each of the bead stoppers and the drop center portion of the wheel rim is so insufficient that leakage of air inside the tire often occurs through some or all of the holes through which the spokes are connected to the wheel rim and/or holes through which the bolts extend from the respective bead stoppers.

When it comes to a pneumatic tire having an endless, hollow tube therein, which is installed on the wheel rim of a wheel structure of the second mentioned type, the pneumatic tire so long as loaded can easily and rapidly be crushed if, for example, a nail is pierced into the inner tube through the tire casing to puncture the pneumatic tire. In most cases, the nail thus pierced into the tube through the tire casing does not separate from the pneumatic tire unless otherwise removed and, therefore, leakage of air inside the tube at the time of puncture would tend to take place through the holes through which the spokes are connected to the wheel rim and also through a perforation in the wheel rim through which an air supply valve leading to the tube extends outwardly, rather than through the pierced tire casing. It has often been experienced that if the pneumatic tire having an inner tube disposed therein is punctured during the use thereof, at least at one of the opposed bead portions slips out of the rim flange and, accordingly, the pneumatic tire can no longer function.

Accordingly, an essential object of the present invention is to provide an improved wheel structure for use with a pneumatic tire, which supports the pneumatic tire thereon in a substantially hermetically sealed manner thereby avoiding any possible leakage of air contained inside the tire, with the substantial elimination of the disadvantages inherent in the conventional tired wheel structure.

Another object of the present invention is to provide an improved wheel structure of the type referred to above, wherein when the pneumatic tire is punctured, it does not permit the air inside the tire to leak out immediately and rapidly and accordingly permits a vehicle e.g., a motorcycle to be driven at a reasonable speed and a reasonable distance to the nearest possible repair shop without substantially adversely affecting the punctured tire.

According to the present invention, the improved wheel structure for use with a pneumatic tire comprises a hub through which the wheel structure is adapted to be mounted on a wheel axle, and a rim connected with and positioned around said hub for supporting the pneumatic tire thereon. The wheel rim includes a drop center portion and a pair of opposed rim flanges extending radially outwardly from both sides of said drop center portion and shaped to retain respective bead portions of the pneumatic tire. The wheel rim further includes a flexible endless band, preferably made of natural or synthetic rubber material, which is placed flat on the tire receiving surface of the wheel rim, the peripheral length of said flexible endless band being within the range of 50 to 90% of the circumference of the wheel rim at one of the bead seat portions which are disposed on both sides of the drop center portion adjacent the respective roots of the rim flanges. The width of the flexible endless band is selected such as to permit both side portions thereof to rest against the rim flanges, respectively, occupying substantially one half the height of each of the rim flange while a substantially intermediate portion of said flexible endless band is held flat against the drop center portion and the bead seat portions of both sides of said drop center portion.

In order to avoid any possible displacement of the flexible endless band in a direction substantially parallel to the axial direction of the wheel axle which is often observable in the conventional tired wheel structures as described above, a combination of one or more ribs and mating grooves is employed. In the illustrated embodiments of the present invention, three parallel ribs are integrally formed with the flexible endless band in the peripheral direction thereof on one of the opposed surfaces facing the bead seat portions while a corresponding number of mating grooves are formed in the wheel rim at the bead seat portions. When the flexible endless band is held flat on the wheel rim, the ribs are in engaging relationship with the respective grooves so that no substantial relative movement between the flexble endless band and the wheel rim take place. These ribs and grooves may be reversed in position.

In addition, a plurality of bead stoppers are also employed. Each of these bead stoppers is preferably made of light metal alloy or rigid plastic material and has one surface concaved with the opposite surface thereof integrally formed with a substantially crater-shaped projection. A set bolt having one end rigidly connected with the bead stopper extends therefrom in alignment with the center of said crater-shaped projection and is used to secure the bead stopper in position in such a manner that the side faces of said bead stopper presses against the bead portions of the tire against the respective rim flanges while the crater-shaped projection tightly contacts the bottom of the drop center portion through the flexible endless band, thereby achieving not only a tight contact between the bead portions and the rim flanges, but also a tight seal to avoid any possible leakage of air through a hole through which the bolt extends in the wheel rim.

Moreover, in order to avoid any possible relative slippage between the tire and the wheel structure in a circumferential direction, each of the side faces of the bead stoppers is ribbed.

These and other objects and features of the present invention will readily become apparent from the following description taken in conjunction with preferred embodiments thereof with reference to the accompanying drawings, in which.

Figure 1:
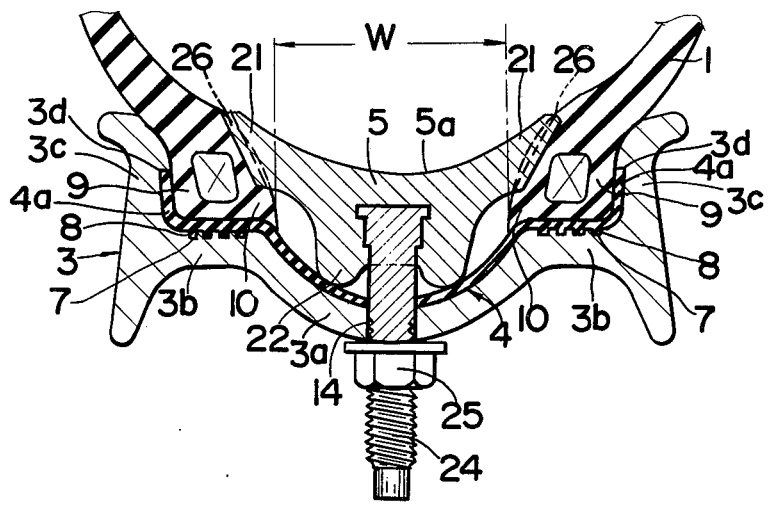
FIG. 1 is a sectional view of a portion of a wheel structure with a tubeless tire disposed thereon, taken perpendicularly to the axis of rotation of the wheel structure.
Figure 5:
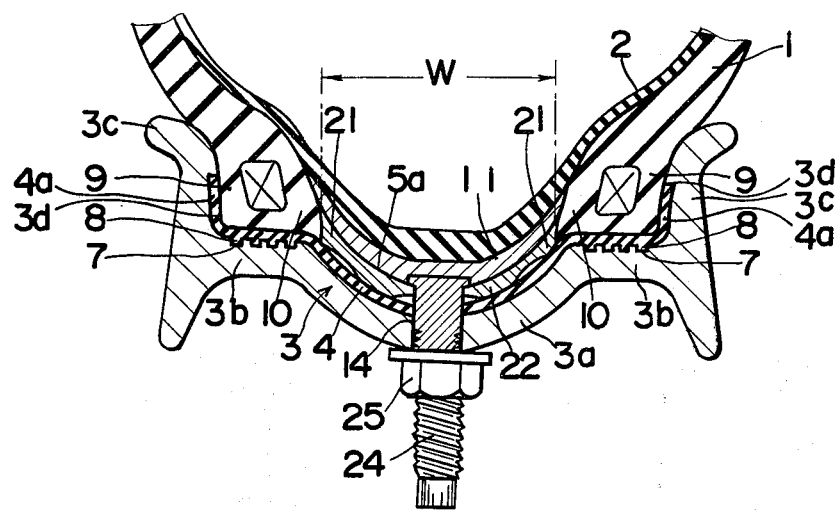
Figure 6:
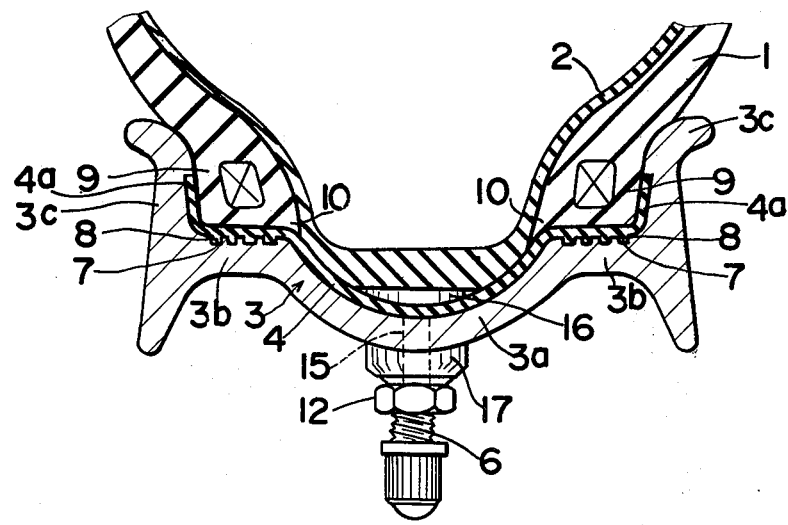

FIGS. 5 and 6 are views similar to FIG. 1, illustrating another embodiment of the present invention and, more particularly, FIG. 5 shows a portion of the wheel structure, mounted with a pneumatic tire including an inner tube, through which a set bolt extends from the bead stopper and FIG. 6 shows another portion of the wheel structure of FIG. 5 through which an air supply valve leading to the inner tube extends.

Before the description of the present invention proceeds, it should be noted that like parts are designated by like reference numerals throughout the accompanying drawings. It is also to be noted that, because of the nature of the present invention applicable both to a wheel structure wherein the rim is integrally formed with the hub and to a wheel structure wherein the rim is connected with the hub by means of spokes, only the rim is illustrated in the accompanying drawings in detail.

The wheel structure according to the first embodiment of the present invention shown in FIGS. 1 to 4 is particularly designed for use with a pneumatic tire which does not employ an inner tube, that is, a tubeless pneumatic tire.

Referring now to FIGS. 1 to 4, the wheel structure shown has a wheel rim 3. The wheel rim 3 includes a substantially radially inwardly concaved, drop center portion 3a, substantially flat bead seats 3b situated on both sides of said drop center portion 3a and a pair of opposed, radially outwardly extending rim flanges 3c. The wheel rim 3 is formed at the bottom of the drop center portion 3a with a plurality of circumferentially equally spaced holes 14, the function of each of which will become clear from the subsequent description. Also, formed at the respective bead seats 3b is one or more, for example, three, grooves 7 circumferentially extending in parallel spaced relationship to each other.

A flexible endless band 4, made of rubber material and having one surface integrally formed with ribs 8 corresponding in number and shape to the grooves 7 in the wheel rim 3, is held flat on the wheel rim 3 as shown with the ribs 8 engaged in the corresponding grooves 7. Preferably, during the manufacture of the endless band 4, at least both side portions, as at 4a, of the flexible endless band 4 are set to stand at a certain angle relative to the remaining portion of said band 4 so as to permit that portions 4a of the flexible endless band 4 to fit to the respective rim flanges 3c as shown when said flexible endless band 4 is held in position on the wheel rim 3 in such a manner as will now be described.

The flexible endless band 4 has a peripheral length within the range of 50 to 90% of the circumference of the wheel rim as measured at any of the bead seats 3b. This means that the peripheral length of the flexible endless band 4 is smaller than the circumference of the wheel rim at the bead seats 3c and, therefore, when the flexible endless band 4 is mounted on the wheel rim in the manner as shown, it can fit around the wheel rim by its own elasticity, tightly contacting the drop center portion 3a, bead seats 3b and rim flanges 3c. Portions of the flexible endless band 4 which may register with the respective holes 14 in the wheel rim when said band 4 is held in position around the wheel rim 3 may be perforated either after or prior to installation of the flexible endless band 4 on the wheel rim 3.

In the construction so far described, it will be readily understood that placement of the pneumatic tire 1 on the wheel rim in a known manner does not cause the flexible endless band to displace at local points in a direction substantially parallel to the wheel axle which may otherwise take place as the bead portions 9 of the tire 1 are alternately slipped over the rim flanges to permit the tire 1 to assume a definite position around the wheel rim. This is because of engagement between the ribs 8 in the flexible endless band 4 and the grooves 7 in the rim 3.

The width of the flexible endless band 4 is preferably selected such as to permit those portions 4 thereof to engage the respective rim flanges 3c, occupying substantially half the height of any of the rim flanges 3c. In order to accommodate those portions 4a of the flexible endless band 4, the respective rim flanges 3c may be formed as at 3d with substantially inverted L-shaped annular recesses each being of a depth equal to or slightly smaller than the thickness of the flexible endless band 4 measured at any of the portions 4a thereof. If these recesses 3d are employed, a combination of the ribs 8 and the grooves 7 may be omitted. However, the employment of the recesses 3d for accommodating the respective portions 4a of the flexible endless band 4 in addition to the combination of the ribs 8 and the grooves 7 is recommended to ensure the prevention of the lateral displacement of the flexible endless band 4 relative to the wheel rim 3.

Figure 2:
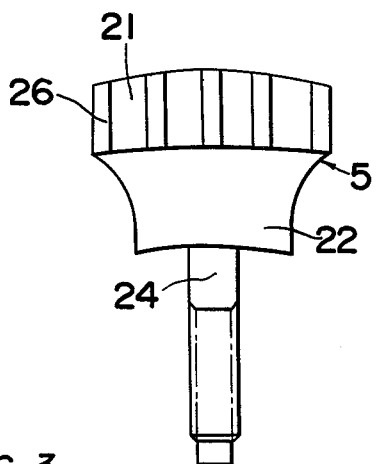
FIG. 2 is a side view of a bead stopper employed in the tired wheel structure of FIG. 1.
Figure 4:
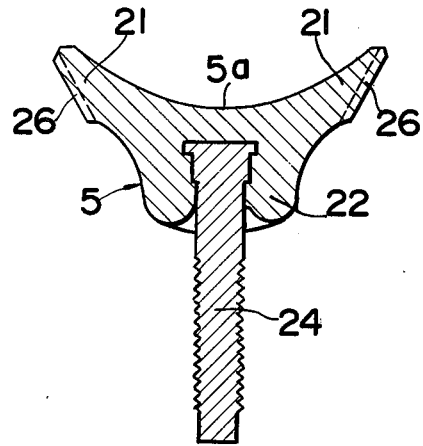
FIG. 4 is a cross sectional view taken along the line A—A in FIG. 2.
Figure 3:
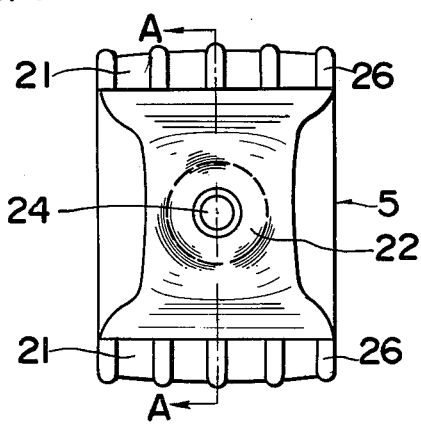
FIG. 3 is a bottom plan view of the bead stopper of FIG. 2.

The wheel structure includes a plurality of bead stoppers, generally indicated by 5, the details of which are best shown in FIGS. 2 to 4. These bead stoppers 5 are substantially mainly used to press the bead portions 9 of the pneumatic tire 1, when said tire 1 has been installed around the wheel rim 3, against the respective rim flanges 3c to completely seal a gap which may otherwise be formed between each of the bead portions 9 of the tire 1 and a corresponding one of the rim flanges 3c. For this purpose, these bead stoppers 5 are arranged around the wheel rim 3 in circumferentially equally spaced relation to each other. Preferably, each of the bead stoppers 5 is made of rigid, but light, material such as rigid plastic or light alloyed metal.

With particular reference to FIGS. 2 to 4, any one of the bead stoppers 5 is shaped to represent a substantially T-shape having one surface concaved as at 5a and the opposite surface integrally formed with a substantially inverted crater-shaped projection 22, the annular tip of which projection 22 is shaped to correspond to the bottom of the drop center portion 3a of the wheel rim 3. A set bolt 24 has a head portion rigidly connected to, or otherwise embedded in, the corresponding bead stopper 5 with the longitudinal axis thereof extending in alignment with the center of the substantial crater of the projection 22. The set bolt 24 includes a nut 25 (FIG. 1) which is used to fasten the bead stopper 5 in position above the drop center portion 3a of the wheel rim 3 in such a manner as will be described later.

The bead stopper 5 is designed such that the chord of the portion of the surface 5a is substantially equal to or greater than the distance, indicated by W in FIG. 1, between the opposed bead toes, as at 10, of the pneumatic tire 1. In the embodiment shown in FIGS. 1 to 4, since the illustrated wheel structure is designed for use with a tubeless tire, the chord of the portion of the surface 5a is greater than the distance W so that, when the bead stopper is placed in position with the projection 22 seated in the bottom of the drop center portion 3a around the associated hole 14 while the bolt 24 extends through said hole 14 and is fastened with the nut 25 with the rim 3 sandwiched between said stopper 5 and said nut 25, both side portions 21 of said stopper 5 press the adjacent bead portions 9 of the tire 1 against the respective rim flanges 3c thereby achieving individual tight contacts between the bead portions 9 and the rim flanges 3c. It should be noted that these tight contacts are, as can be readily understood by those skilled in the art, necessary to avoid any possible leakage of air inside the tire 1 and also to avoid any possible separation of one or both of the bead portions 9 of the tire from the associated bead seats 3b over the rim flanges 3c, which separation may otherwise occur at the time of puncture of the pneumatic tire 1.

It has often been experienced that, when the pneumatic tire is operated with a considerably low pneumatic pressure inside the tire, the tire and, more particularly, the bead portions of the tire undergo a relative sliding movement in the circumferential direction relative to the wheel rim 3. In order to avoid this, each of the head stoppers 5 of the above construction has both side faces adjacent the side portions 21 patterned to provide a plurality of retaining ribs 26 extending in spaced relation to each other in a direction substantially parallel to the axial direction of the bolt 24 or in a direction substantially perpendicular to the circumferential direction of the wheel structure. These retaining ribs 26 are, when the bead stopper 5 is held in position above the drop center portion 3a in the manner shown in FIG. 1, thrusted into the respective bead portions 9 thereby avoiding any slippage which may otherwise take place between the bead portions 9 and the rim flanges 3c.

Referring back to FIG. 1, when the pneumatic tire 1 is to be installed around the wheel rim 3, the bead stoppers 5 are first mounted on the wheel rim 3 with the respective bolts 24 inserted through the holes 14 and, thereafter, the tire 1 is installed in any known manner. Subsequently, the nuts 25, that have temporarily been loosened on the associated bolts 24, are rigidly fastened with the bottom of the drop center portion 3a sandwiched between the bead stoppers 5 and said nuts 25, thereby pulling the bead stoppers 5 close to the bottom of the drop center portion 3a. As each of the bead stoppers 5 is thus pulled with the nut 25 fastened to the bolt 24, the ribbed side portions 21 and the annular tip of the crater-shaped projection 22 of the bead stopper 5 are thrusted into the adjacent bead portions 9 of the tire 1 and a portion of the flexible endless band 4 around the associated hole 14, respectively, thereby achieving a tight contact between the bead portions 9 and the rim flange 3c and between the bead stopper 5 and the drop center portion 3a around the hole 14 to substantially completely avoid formation of any gap or clearance which may otherwise permit the air inside the tire 1 to escape or leak out.

It should be noted that, although the separate-bead stoppers 5 have been described as employed in the illustrated embodiment of FIGS. 1 to 4, a single, substantially split ring shaped bead stopper may be advantageously and effectively employed. Where separate bead stoppers are employed such as shown, the number of the bead stoppers 5 to be employed depends upon the size of the wheel structure with which they are used. In the case of a motorcycle wheel structure, four to six bead stoppers can be utilized.

It is also to be noted that the shape of each of the bead stoppers 5 is not limited to that shown, but rather any other shape of bead stoppers can equally be employed as long as each of them has functional equivalents of the ribbed side portions 21, bolt 24 and crate-shaped projection 22.

According to another embodiment of the present invention, the wheel structure is designed for use with a pneumatic tire having a hollow tube 2. Even the wheel structure according to the embodiment of FIGS. 5 and 6 is basically the same as the wheel structure according to the foregoing embodiment of FIGS. 1 to 4 except for the following respects.

A rubber pad 11 is lined, or otherwise secured, to the concaved surface 5a of each of the bead stoppers 5 thereby protecting the inner hollow tube 2 from being worn by frictional contact with the bead stopper 5. Either separate rubber pads 11, one for each bead stopper 5, may be employed, or a single, endless rubber pad may be employed. Where the single, endless rubber pad is employed, it may not be rigidly secured to the individual concave surfaces 5a of the bead stoppers 5, but may be allowed to grasp said surfaces by the effect of its own elasticity.

In addition, a portion of the wheel rim 3 where a perforation 15 is formed for accommodating an air supply valve assembly, generally indicated by 6 in FIG. 6 and leading to the inner hollow tube 2, to extend therethrough is provided with a pair of substantially ring-shaped rubber sealing members 16 and 17. The sealing member 16 is mounted on the valve assembly 6 between the inner hollow tube 2 and the flexible endless band 4 and the sealing member 17 is mounted on the valve assembly 6 between the rim 3 and a nut 12 which is threadably mounted on the valve assembly 6. The details of the valve assembly 6 and the function of the nut 12 are well known to those skilled in the art and, therefore, the description thereof is omitted herein for the sake of brevity. In any event, because of the employment of the sealing members 16 and 17, no substantial leakage of air through the perforation 15 occurs.

So far as the embodiment of FIGS. 5 and 6 is concerned, it should be apparent that, even if a nail is, for example, pierced into the tube 2 through the tire casing 1, air inside the tube 2 does not immediately leak out of the tire casing 1 and is confined within an annular space defined by the tire casing 1 and the wheel rim 3 to an extent that the punctured tire permits a vehicle, e.g., a motorcycle, to run to the nearest possible repair shop, without the inner tube 2 being adversely affected.

Moreover, in the event that a motorcycle equipped with wheel structures of the present invention is driven in a motorcycle trial race where the motorcycle is driven through a severe course including rough road, hills, muddy roads and rivers while the tire pressure is considerably low, any puncture of the tire which may otherwise be caused by a tube pinching action can be advantageously avoided. Even if the puncture occurs, air leaking out of the tube does not substantially leak out of the tire casing and, therefore, the motorcycle can complete the race to the finish.

Although the present invention has been fully described in conjunction with the preferred embodiments, it should be noted that various changes and modifications will be apparent to those skilled in the art. Therefore, unless they depart from the true scope of the present invention, such changes and modifications should be construed as included within the scope of the present invention.

What I claim is:

1. A vehicle wheel structure for use with a pneumatic tire, which comprises:
    a hub, a rim, and a wheel axle, said hub being adapted to support the wheel structure therethrough on said wheel axle and said rim being adapted to support the pneumatic tire which is fitted therearound;
    said rim having a pair of opposed rim flanges extending radially outwardly from respective sides of said rim, said pneumatic tire having a pair of opposed bead portions which substantially form respective side edges of said pneumatic tire, said bead portions, when said pneumatic tire is fitted around said rim, abutting against said respective rim flanges;
    a flexible endless band held flat on said rim;
    at least one rib and a corresponding mating groove formed in each of the side portions of said flexible endless band and each of the side portions of said rim adjacent said rim flanges, respectively, in the circumferential direction of said wheel structure, said rib, when said flexible endless band is held flat on said rim, being in engaging relationship with said mating groove, thereby avoiding any possible lateral displacement of said flexible endless band relative to said rim which may otherwise take place in a direction substantially perpendicular to the mid-circumferential plane of said tire; and
    a plurality of bead stoppers adapted to be disposed on said rim and between said bead portions of said pneumatic tire in substantially equally spaced relationship in the circumferential direction of said wheel structure, each of said bead stoppers having one surface formed with a substantially crater-shaped projection adapted to contact a central portion of said rim between said side portions of said rim through said flexible endless band, and a pair of side portions extending laterally outwardly in opposite directions from the body of said bead stopper and adapted to contact said bead portions of said pneumatic tire, each of said bead stoppers including a set bolt having one end rigidly connected to said stopper, a substantially intermediate portion of said bolt extending in alignment with the center of said crater-shaped projection and the other end of said bolt being adapted to terminate outside said rim facing said hub, said crater-shaped projection and said side portions of each of said bead stoppers acting, when said bead stoppers are held in position on said rim and between said bead portions, in such a manner that said bolt extends through a perforation formed in said central portion of said rim, and is subsequently fastened with a corresponding nut with said rim and flexible endless band being firmly sandwiched between said nut and said crater-shaped projection, to firmly press said bead portions against said respective rim flanges, thereby causing said bead portions to substantially hermetically contact said respective rim flanges over the entire circumference of each of said bead portions and also to seal any clearance which may otherwise be formed between said bolt and said perforation in said rim.

2. A vehicle wheel structure as claimed in claim 1, wherein each of said side portions of said bead stoppers has a ribbed side face which presses against the corresponding bead portion of the tire when the corresponding bead stopper is held in position on said rim.

3. A vehicle wheel structure as claimed in claim 1, wherein said flexible endless band has a width selected such that both side edges of said flexible endless band terminate in contact with said respective rim flanges while the remaining portion of said flexible endless band is in contact with said central portion of said rim.

4. A vehicle wheel structure as claimed in claim 3, including an inner hollow tube disposed in said pneumatic tire and a rubber padding disposed above said stopper means for avoiding frictional contact between said inner hollow tube and said bead stoppers.

5. A vehicle wheel structure as claimed in claim 1, wherein the peripheral length of said flexible endless band is within the range of 50 to 90% of the circumference of the corresponding side rim measured at the joint between one of said rim flanges and said portion of said rim.

6. A vehicle wheel structure as claimed in claim 5, including an inner hollow tube disposed in said pneumatic tire and a rubber padding means disposed above said bead stoppers for avoiding frictional contact between said inner hollow tube and each of said bead stoppers.

7. A vehicle wheel structure as claimed in claim 5, wherein each of said side portions of said bead stoppers has a ribbed side face which presses against the corresponding bead portion of the tire when the corresponding bead stopper is held in position on said rim.

8. A vehicle wheel structure as claimed in claim 6, wherein each of said side portions of said bead stoppers has a ribbed side face which presses against the corresponding bead portion of the tire when the corresponding bead stopper is held in position on said rim.

9. A vehicle wheel structure as claimed in claim 1, including an inner hollow tube disposed in said pneumatic tire and a rubber padding means disposed above said stopper means for avoiding frictional contact between said inner hollow tube and said bead stoppers.

10. A vehicle wheel structure as claimed in claim 9, wherein each of said side portions of said bead stoppers has a ribbed side face which presses against the corresponding bead portion of the tire when the corresponding bead stopper is held in position on said rim.

11. A combined pneumatic tire and wheel structure which comprises:
a pneumatic tire having a pair of opposed bead portions which substantially form respective side edges of said tire;
a wheel structure having a hub, a rim and a wheel axle, said hub being adapted to support said wheel structure therethrough on said wheel axle and said rim being adapted to support the pneumatic tire which is fitted therearound;
said rim having a pair of opposed rim flanges extending radially outwardly from respective sides of said rim, said pneumatic tire, when fitted around said rim, being held such that said bead portions are abutted against said respective rim flanges;
a flexible endless band held flat on said rim and extending in the circumferential direction of said wheel structure, said flexible endless band having a pair of opposed side portions sandwiched between the bead portion of said pneumatic tire and the corresponding side portion of said rim when said band is held in position on said rim;
at least one rib and a corresponding mating groove formed in each of said side portions of said flexible endless band and each of said side portions of said rim adjacent said rim flanges, respectively, in the circumferential direction of said wheel structure, said rib, when said flexible endless band is held flat on said rim, being in engaging relationship with said mating groove, thereby avoiding any possible lateral displacement of said flexible endless band relative to said rim which may otherwise take place in a direction substantially perpendicular to the mid-circumferential plane of said tire; and
a plurality of bead stoppers adapted to be disposed on said rim and between said bead portions of said pneumatic tire in substantially equally spaced relationship in the circumferential direction of said wheel structure, each of said bead stoppers having one surface formed with a substantially crater-shaped projection adapted to contact a central portion of said rim between said side portions of said rim through said flexible endless band, and a pair of side portions extending laterally outwardly in opposite directions from the body of said bead stopper and adapted to contact said bead portions of said pneumatic tire, each of said bead stoppers including a set bolt having one end rigidly connected to said stopper, a substantially intermediate portion of said bolt extending in alignment with the center of said crater-shaped projection and the other end of said bolt being adapted to terminate outside said rim facing said hub, said crater-shaped projection and said side portions of each of said bead stoppers acting, when said bead stoppers are held in position on said rim and between said bead portions, in such a manner that said bolt extends through a perforation formed in said central portion of said rim and is subsequently fastened with a corresponding nut with said rim and flexible endless band being firmly sandwiched between said nut and said crater-shaped porjection, to firmly press said bead portions against said respective rim flanges, thereby causing said bead portions to substantially hermetically contact said respective rim flanges over the entire circumference of each of said bead portions and also to seal any clearance which may otherwise be formed between said bolt and said perforation.

12. A combined pneumatic tire and wheel structure as claimed in claim 11, wherein said flexible endless band has a peripheral length within the range of 50 to 90% of the circumference of said rim measured at the joint between one of said rim flanges and one of the opposed sides of said rim which provide respective seats for said bead portions.

13. A combined pneumatic tire and wheel structure as claimed in claim 1, wherein said flexible endless band has a width selected such that both side edges of said flexible endless band terminate in contact with said respective rim flanges while the remaining portion of said flexible endless band is in contact with said central portion of said rim.

14. A combined pneumatic tire and wheel structure as claimed in claim 11, wherein each of said side portions of said bead stoppers has a ribbed side face to permit said side portion to be thrusted into the corresponding bead portion of the tire when the corresponding bead stopper is held in position on said rim.

15. A combined pneumatic tire and wheel structure as claimed in claim 11, wherein said pneumatic tire comprises a tire casing and an inner hollow tube having an air supply valve assembly through which said tube is adapted to be inflated, said valve assembly adapted to extend through a hole, formed in said rim, and to be fastened with a nut with said rim and said flexible endless band firmly sandwitched between said inner hollow tube and said nut fastened to said valve assembly.

16. A combined pneumatic tire and wheel structure as claimed in claim 15, wherein said flexible endless band has a peripheral length within the range of 50 to 90% of the circumference of said rim measured at the joint between one of said rim flanges and one of the opposed sides of said rim which provide respective seats for said bead portions.

17. A combined pneumatic tire and wheel structure as claimed in claim 15, wherein said flexible endless band has a width selected such that both side edges of said flexible endless band terminate in contact with said respective rim flanges while the remaining portion of said flexible endless band is in contact with a portion of said rim defined between said rim flanges.

18. A combined pneumatic tire and wheel structure as claimed in claim 15, further comprising at least one rib and a corresponding mating groove formed in said flexible endless band and said rim, respectively, in a circumferential direction of said wheel structure, said rib, when said flexible endless band is held flat on said rim, being in engaging relationship with said mating groove, thereby avoiding any lateral displacement of said flexible endless band relative to said rim.

19. A combined pneumatic tire and wheel structure as claimed in claim 15, wherein each of said side portions of said bead stoppers has a ribbed side face which presses against the corresponding bead portion of the tire when the corresponding bead stopper is held in position on said rim.

20. A combined pneumatic tire and wheel structure as claimed in claim 15, further comprising rubber padding means disposed above said stopper means for avoiding frictional contact between said inner hollow tube in said pneumatic tire casing and said stopper means.

21. A combined pneumatic tire and wheel structure as claimed in claim 15, further comprising at least two annular sealing members, one being disposed between said inner hollow tube and said flexible endless band and the other being disposed between said rim and said nut fastened to said valve assembly, both of said sealing members being mounted on said valve assembly.

* * * * *